(12) United States Patent
Koelln et al.

(10) Patent No.: US 11,225,999 B2
(45) Date of Patent: Jan. 18, 2022

(54) ROTARY JOINT AND FASTENING ARRANGEMENT

(71) Applicant: AIRBUS OPERATIONS GMBH, Hamburg (DE)

(72) Inventors: Jan Christoph Koelln, Hamburg (DE); Volker Riehl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 727 days.

(21) Appl. No.: 16/165,530

(22) Filed: Oct. 19, 2018

(65) Prior Publication Data

US 2019/0120284 A1 Apr. 25, 2019

(30) Foreign Application Priority Data

Oct. 25, 2017 (DE) ..................... 10 2017 219 150.3

(51) Int. Cl.
*F16C 11/06* (2006.01)
*B64C 1/06* (2006.01)
*B64D 11/00* (2006.01)

(52) U.S. Cl.
CPC .......... *F16C 11/0609* (2013.01); *B64C 1/061* (2013.01); *B64D 11/00* (2013.01);
(Continued)

(58) Field of Classification Search
CPC .............. F16C 11/0614; F16C 11/0657; F16C 11/0609; F16C 11/0695; F16C 11/0661;
(Continued)

(56) References Cited

U.S. PATENT DOCUMENTS 3,374,016 A * 3/1968 Melton ............... F16C 11/0661
403/125
3,638,243 A * 2/1972 Campbell, Jr. ....... A61F 2/4225
623/20.22
(Continued)

FOREIGN PATENT DOCUMENTS

EP 1 743 804 A1 1/2007
EP 2 544 921 B1 12/2014

OTHER PUBLICATIONS

German Search Report for Application No. 10 2017 219 150.3 dated Dec. 17, 2018.

*Primary Examiner* — Daniel J Wiley
(74) *Attorney, Agent, or Firm* — Jenkins, Wilson, Taylor & Hunt, P.A.

(57) ABSTRACT

A rotary joint includes an inner joint element which has a spherically shaped inner convex joint face and an inner joint connection head protruding from the inner convex joint face; an outer joint element which has a spherically shaped inner concave joint face, a spherically shaped outer convex joint face and an outer joint connection head protruding from the outer convex joint face, wherein the inner joint element is held within the outer joint element such that the two joint elements can be rotated with respect to one another along the inner joint faces; and a joint bearing which has a spherically shaped outer concave joint face, wherein the outer joint element is held within the joint bearing such that the outer joint element can be rotated in the joint bearing along the outer joint faces.

13 Claims, 3 Drawing Sheets

(52) U.S. Cl.
CPC ...... *F16C 11/0614* (2013.01); *F16C 11/0619* (2013.01); *F16C 11/0623* (2013.01); *F16C 11/0661* (2013.01); *F16C 11/0695* (2013.01); *F16C 2326/43* (2013.01)

(58) Field of Classification Search
CPC . F16C 11/0623; F21V 21/26–30; F16M 11/14
See application file for complete search history.

(56) References Cited

U.S. PATENT DOCUMENTS

| | | | | |
|---|---|---|---|---|
| 3,791,457 | A | * | 2/1974 | Hanser ................... E02F 3/815 172/781 |
| 4,347,014 | A | * | 8/1982 | Smith ................. F16C 11/0661 403/125 |
| 10,925,798 | B2 | * | 2/2021 | Ishibashi ............... A61H 1/008 |

\* cited by examiner

ROTARY JOINT AND FASTENING ARRANGEMENT

CROSS-REFERENCE TO RELATED APPLICATION

This application claims priority to German Application No. 10 2017 219 150.3 filed Oct. 25, 2017, the entire disclosure of which is incorporated by reference herein.

TECHNICAL FIELD

The present disclosure relates to a rotary joint. The present disclosure further relates to a fastening arrangement having such a rotary joint for positionally fixing a monument on a structure of a vehicle, in particular an aircraft or spacecraft.

Although usable in a wide range of applications, the present disclosure and the problem on which it is based are explained in more detail with reference to passenger aircraft. However, the rotary joints described can also be used in various vehicles and in all fields of the transport industry, for example for road vehicles, for rail vehicles, for general aircraft or for watercraft. Moreover, the present rotary joints can generally be used for connecting a wide variety of structures in a wide range of applications.

BACKGROUND

Aircraft cabins of passenger aircraft also have, in addition to the passenger seats, built-ins which are provided for use by the crew or the passengers of the aircraft. Such built-ins in an aircraft passenger cabin comprise, for example, stowage cabinets, toilets, on-board galleys, bar units, etc. and are also referred to as monuments. Because of the naturally limited available space in aircraft cabins, such monuments have a highly integrated and compact design and are, moreover, frequently provided as integral modules. Such monuments are typically anchored in a positionally fixed manner at their housing in a corresponding installation position within the aircraft cabin. For example, a metal tension rod and/or compression rod can couple a housing upper side of a monument to a primary structure, in particular a frame of an aircraft.

Such coupling to a frame can be made possible, for example, via a holder, as can be seen in FIG. 6. Here, the reference sign 20 designates the holder which is fastened to a structure 15, in particular a frame, of an aircraft. The holder 20 has a first fastening position 21 and a second fastening position 22. For example, a compression/tension rod (not depicted) can be mounted at one end at the second fastening position 22 and fastened by the other end to a monument. Here, the first fastening position 21 can serve, for example, to fix this fastening arrangement to the immediately adjacent frame via a further compression/tension rod. Because of tolerances and different orientations of the individual components, for example because of deflection of a floor on which the monument stands, and a subsequent deflection of the compression/tension rod, it is possible in such an arrangement for additional loads to occur which are taken up by the frame.

SUMMARY

It is one idea of the present disclosure to find solutions, which avoid undesired load introduction, for a joint connection which can be used in as flexible a manner as possible.

According to a first aspect of the disclosure herein, a rotary joint comprises an inner joint element which has a spherically shaped inner convex joint face and an inner joint connection head protruding from the inner convex joint face. The rotary joint further comprises an outer joint element which has a spherically shaped inner concave joint face, a spherically shaped outer convex joint face and an outer joint connection head protruding from the outer convex joint face, wherein the inner joint element is held within the outer joint element in such a way that the two joint elements can be rotated with respect to one another along the inner joint faces. The rotary joint further comprises a joint bearing which has a spherically shaped outer concave joint face, wherein the outer joint element is held within the joint bearing in such a way that the outer joint element can be rotated in the joint bearing along the outer joint faces.

According to a second aspect of the disclosure herein, a fastening arrangement for positionally fixing a monument on a structure of a vehicle, in particular an aircraft or spacecraft, is provided. The fastening arrangement comprises a rotary joint according to the disclosure herein. The fastening arrangement further comprises a tension rod and/or compression rod which couples the monument to one of the joint connection heads of the rotary joint. The fastening arrangement further comprises a further compression/tension rod which couples the correspondingly other joint connection head to the structure of the vehicle.

According to a third aspect of the disclosure herein, an aircraft or spacecraft having a fastening arrangement according to second aspect of the disclosure herein is provided.

An idea on which the present disclosure is based comprises providing a double-spherical joint in which the load paths of the joint connections necessarily meet at a fixedly defined point within the joint, with the result that no undesired loads are introduced into the joint and in particular no moments are introduced into the adjoining structure. For this purpose, the joint connections are designed to be movable, with the result that these can be automatically oriented with tolerances and/or movements of the connected components. For this purpose, the solution according to the disclosure herein proposes that two spherical joints be nested inside one another in the manner of onion skins. A first spherical joint offers a first joint connection on the inside. Around this first spherical joint there is arranged a second spherical joint which provides a second joint connection. The two joint connections are designed to be rotatable with respect to one another and relatively to the joint bearing. As a result, a versatile joint is created which completely avoids the occurrence of undesired loads. The rotary joint of the present disclosure can be, in particular, a double ball joint, with the outer joint element simultaneously acting as a joint head and joint socket of in each case one of the ball joints. In this context, the rotary joint of the present disclosure can also be a ball-and-socket joint in which the joint socket engages around the joint head beyond its equator. The rotary joint according to the disclosure herein is suitable, for example, for the connection of monuments in aircraft in order to determine an ideal load path from the monument fastenings to the primary structure of the aircraft.

According to one development, the inner joint element can take the form of a sphere. For example, the inner joint element can take the form of a full sphere or a hollow sphere.

According to one development, the outer joint element can take the form of a hollow sphere with a clearance. Here, the inner joint connection head can project through the clearance. Both the inner joint element and the outer joint element can thus take the form of sphere nested one inside the other about a common central point. The clearance can be of circular shape, for example, with the result that effectively a part of the surface of the outer joint element is cut out in the form of a spherical cap.

According to one development, the joint bearing can be annular. Here, the outer concave joint face of the joint bearing can be designed as a symmetrical spherical zone. What is meant here by spherical zone is the curved surface part of a spherical disc, i.e. of the part of a full sphere which is cut out from two parallel planes. For example, the outer joint element can take the form of a hollow sphere which is inserted into the joint bearing with a precise fit and is thereby held solely on account of its geometrical shape by the annular joint bearing.

According to one development, the curvature of the inner convex joint face can correspond to the curvature of the inner concave joint face. The curvature of the outer convex joint face can correspond to the curvature of the outer concave joint face.

According to one development, the inner joint element can be designed to fit precisely in the outer joint element. The outer joint element can in turn be designed to fit precisely in the joint bearing. In particular, the inner joint element can in such a way be held solely on account of its geometrical shape in the outer joint element.

According to one development, the two joint connection heads can be oriented in opposite hemispheres. In particular, the joint bearing can be annular and the two joint elements can take the form of spheres which are nested one inside the other. The outer joint element can have a clearance on the hemisphere opposed to the outer joint connection head, through which clearance the inner joint connection head projects. As a result, each joint connection head thus offers a connection point, in each case on one side of the annular joint bearing.

According to one development, the two joint connection heads can protrude from the convex joint faces in a radial direction.

According to one development, the inner joint element, the outer joint element and/or the joint bearing can each be formed integrally. In particular, the inner joint element, the outer joint element and the joint bearing can be jointly manufactured in an additive process. The rotary joint can thus be completely manufactured in a single process in an integral manner without particular outlay, additional assembly steps or even manual work being required. In principle, the rotary joint can be manufactured from all materials or material combinations for which additive processes are known. For example the rotary joint can be formed from one or more plastics and/or one or more metal materials. In a specific example, the rotary joint is manufactured from titanium.

In generative or additive manufacturing processes, also generally referred to as "3D printing processes", proceeding from a digitized geometric model of an object, one or more starting materials are sequentially arranged over one another in layers and hardened. Thus, in selective laser melting (SLM), for example, a component is built up in layers from a modelling material, for example a plastic or a metal, by the modelling material being applied in powder form to a support and being liquefied in a targeted manner by local laser irradiation, with the result that, after cooling, a solid, coherent component is obtained. 3D printing offers extraordinary design freedom and makes it possible to produce, inter alia, objects with negligible outlay which would not be able to be produced with conventional methods or only with considerable outlay. For this reason, 3D printing processes are currently widespread in industrial design, in the automotive industry, in the air and space travel industry or generally in industrial product development in which a resource-efficient process chain is used for the need-based small and large series manufacture of individualized components.

3D printing processes are particularly advantageous in the present case since they allow the production of three-dimensional components in primary forming processes without requiring specific manufacturing tools tailored to the outer shape of the components. This makes possible highly efficient, material-saving and time-saving production processes for components and parts. Such 3D printing processes are particularly advantageous in the air and space travel sector, since very many different components tailored to specific use purposes are used there, and these components can be produced in such 3D printing processes with low costs, short manufacturing lead time and with little complexity in the manufacturing plants required for the production. 3D printing processes in the context of the present application comprise all generative or additive manufacturing processes in which, on the basis of geometric models, objects of predefined shape are produced from shapeless materials such as liquids and powders or shape-neutral semifinished products, such as, for example, strip- or wire-like material by chemical and/or physical processes in a specific generative manufacturing system. 3D printing processes within the context of the present application use additive processes in which the starting material is built up sequentially in layers in predetermined shapes.

According to one development, a baseplate can be provided which bears the joint bearing. For this purpose, the joint bearing can be mounted on and/or fastened to the baseplate, for example via releasable or non-releasable connections. Alternatively, however, the baseplate can also be integrally formed with the joint bearing, for example using an additive process.

According to one development, the structure can be a frame. The rotary joint can be fastened to an adjacent frame.

The above configurations and developments can be combined together in any desired sensible manner. Further possible configurations, developments and implementations of the disclosure herein also include not explicitly mentioned combinations of features of the disclosure herein described previously or described in the following in respect of the embodiments. In particular, a person skilled in the art will also add individual aspects as improvements or additions to the respective basic form of the present disclosure.

BRIEF DESCRIPTION OF THE DRAWINGS

In the following, the present disclosure will be described in more detail with reference to the embodiments represented in the schematic and example figures, in which.

Figure 1:
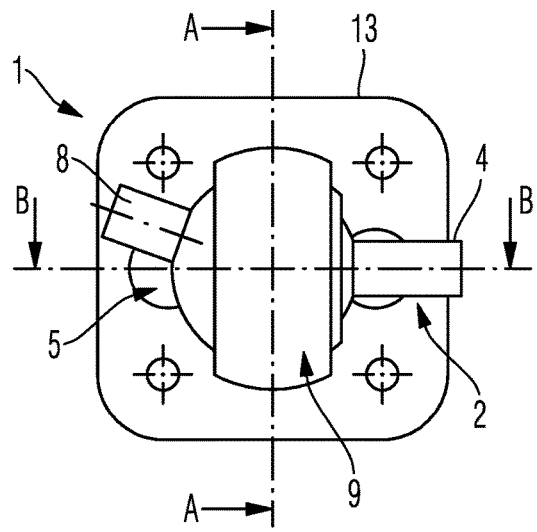
FIG. 1 shows a schematic plan view together with two sectional views of a rotary joint according to an embodiment of the disclosure herein.

The accompanying figures are to provide a further understanding of the embodiments of the disclosure herein. They illustrate embodiments and, together with the description, serve to explain the principles and concepts of the disclosure herein. Other embodiments and many of the mentioned advantages are revealed in view of the drawings. The elements of the drawings have not necessarily been drawn true-to-scale relative to one another.

In the figures of the drawings, identical, functionally identical and identically acting elements, features and components have been respectively provided with the same reference numerals, unless indicated otherwise.

DETAILED DESCRIPTION

Figure 1A:
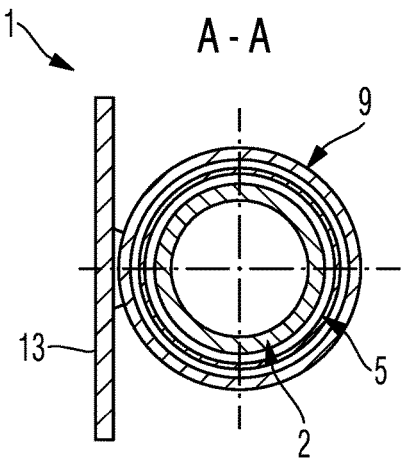

FIG. 1 shows a schematic plan view (top left) together with two sectional views (FIG. 1B, bottom left: section along line B-B, and FIG. 1A, top right: section along line A-A) of a rotary joint according to an embodiment of the disclosure herein. Here, the reference sign 1 designates the rotary joint. The rotary joint 1 can also be seen in FIGS. 2 and 3 in a schematic perspective view.

The rotary joint 1 comprises an inner joint element 2 which has a spherically shaped inner convex joint face 3 and an inner joint connection head 4 protruding from the inner convex joint face 3. In this embodiment, the inner joint element 2 very specifically takes the form of a full sphere. The inner joint connection head 4 is cylindrically formed and oriented in the radial direction (cf. FIG. 3). The inner joint connection head 4 serves as a connection point for connecting components to the rotary joint 1, for example a compression/tension rod or similar components (see further below with reference to FIG. 4).

The rotary joint 1 further comprises an outer joint element 5 which has a spherically shaped inner concave joint face 6, a spherically shaped outer convex joint face 7 and an outer joint connection head 8 protruding radially outwards from the outer convex joint face 7. In this embodiment, the outer joint element 5 is formed as a hollow sphere in a corresponding manner to the inner joint element 2, while the outer joint connection head 8 is likewise cylindrically formed. The diameters or radii of the spheres are tailored to one another in such a way that the inner joint element 2 is inserted with a precise fit into the outer joint element 5, i.e. is held in such a manner by the latter. Moreover, the outer joint element 5 has a circular clearance 12 through which the inner joint connection head 4 projects with lateral play (cf. in particular FIG. 3). Here, the outer joint connection head 8 and the inner joint connection head 4 are oriented in different hemispheres. By virtue of this geometric design, the two joint elements 2, 5 can be rotated with respect to one another along the inner joint faces 3, 6, with the range of the possible rotation being determined by the dimensioning of the clearance 12 and of the inner joint connection head 4.

The rotary joint 1 further comprises a joint bearing 9 which has a spherically shaped outer concave joint face 11. In this embodiment, the joint bearing 9 is designed to be annular in a corresponding manner to the outer joint element 5, with the outer concave joint face 11 having the shape of a symmetrically spherical zone which is dimensioned in such a way that the outer joint element 5 is held with a precise fit in the joint bearing 9. Here, the shape of a symmetrical spherical zone guarantees that the outer joint element 5 is firmly held in the joint bearing 9 and cannot be moved out of the latter. By virtue of this geometry, the outer joint element 5 can furthermore be rotated in the joint bearing 9 along the outer joint faces 7, 11.

The rotary joint 1 also has a baseplate 13 to which the joint bearing 9 is fastened. In this embodiment, the individual components of the rotary joint 1 are manufactured integrally from titanium or a titanium alloy using an additive process. 3D printing processes make it possible here for the rotary joint 1 to be manufactured completely in one process step by the inner joint element 2, the outer joint element 5 and the joint bearing being simultaneously printed. With conventional processes, such a rotary joint 1 could at best be produced only with considerable outlay. The advantages of the rotary joint 1 shown are explained below by way of example with reference to FIGS. 4 and 5 in a specific application.

Figure 1B:
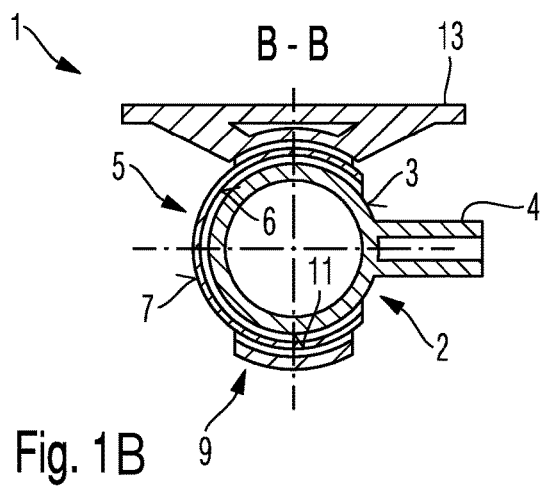
Figure 4:
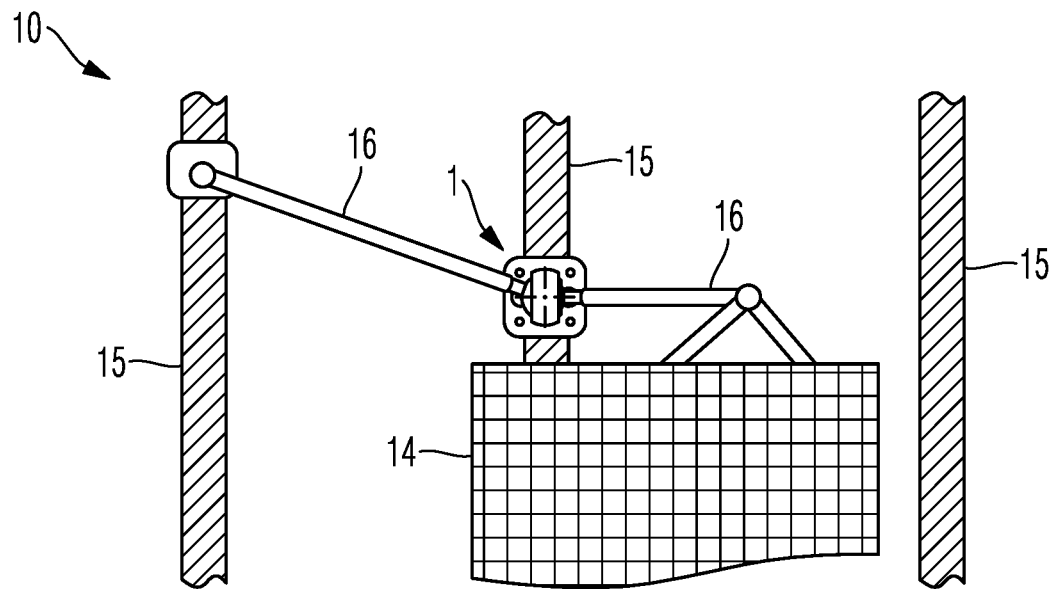
FIG. 4 shows a schematic sectional view of a fastening arrangement according to an embodiment of the disclosure herein having the rotary joint from FIG. 1.
Figure 5:
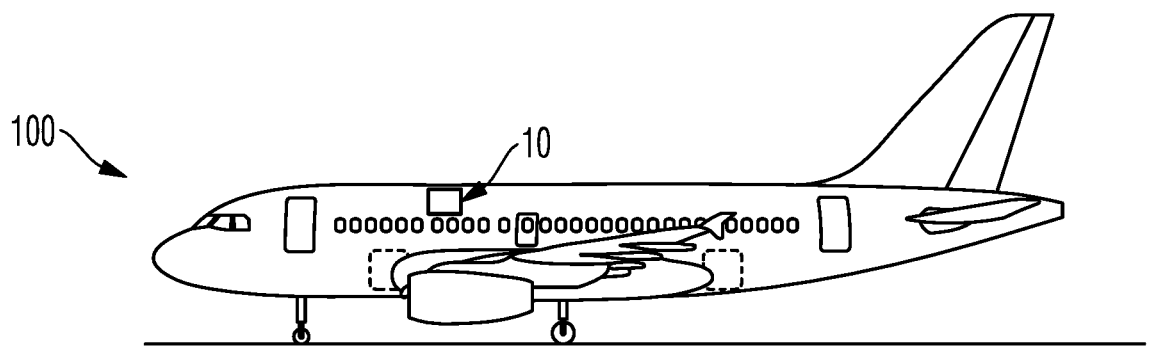
FIG. 5 shows a schematic side view of an aircraft having the fastening arrangement from FIG. 4.
Figure 6:
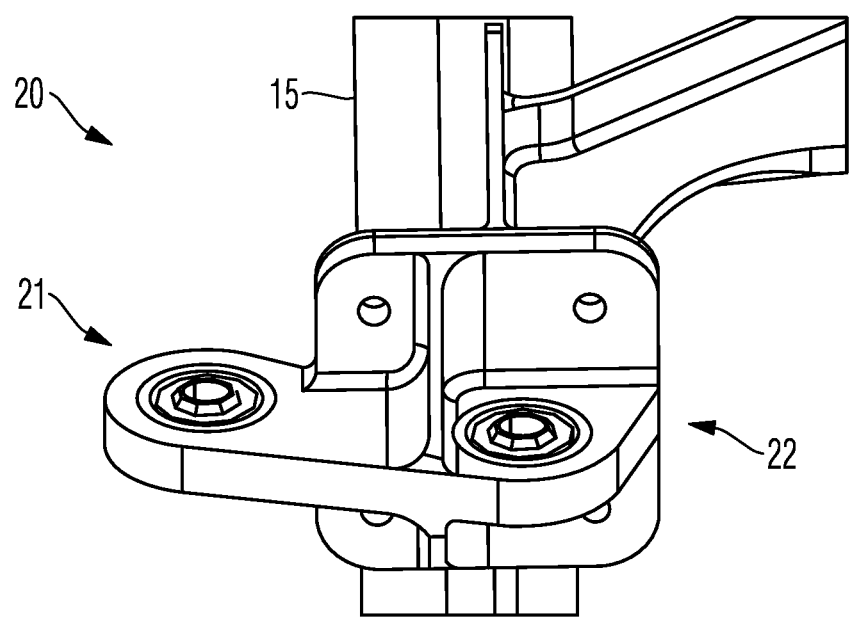
FIG. 6 shows a schematic perspective view of an exemplary holder.

In this respect, FIG. 4 shows a schematic side view of a fastening arrangement 10 according to one embodiment of the disclosure herein having the rotary joint 1 from FIGS. 1-1B. The fastening arrangement 10 is situated in the aircraft 100 shown in FIG. 5 and serves for positionally fixing a monument 14 on a structure 15, in particular a frame, of the aircraft 100. In the embodiment shown in FIG. 4, the monument 14 is a box-shaped built-in for a passenger cabin which has been omitted in FIG. 4 for reasons of clarity. The monument 14 can be, for example, a stowage cabinet or an on-board galley or the like. In principle, the solution according to the disclosure herein can be applied to a wide range of monuments 14 which are intended to be positioned fixedly in an aircraft cabin.

Figure 2:
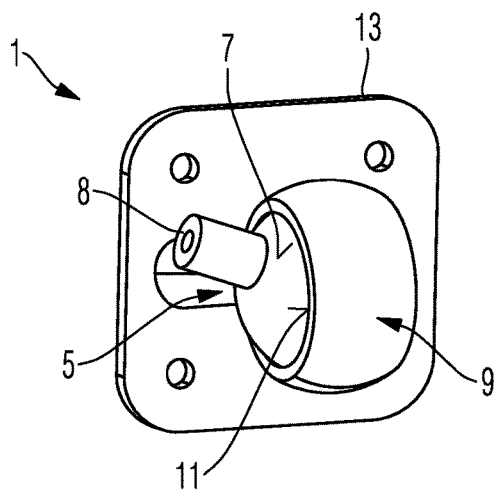
FIG. 2 shows a schematic perspective view of the rotary joint from FIG. 1.
Figure 3:
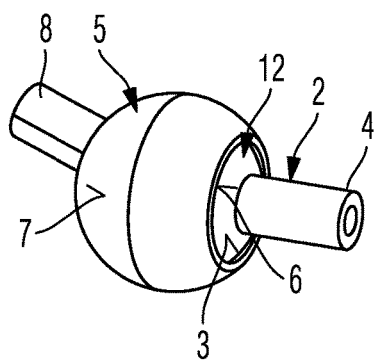
FIG. 3 shows a schematic perspective view of two joint elements of the rotary joint from FIG. 1.

The rotary joint 1 from FIGS. 1-3 is fastened by the baseplate 13 to a frame (the central one) shown in FIG. 4, for example by screws, rivets or the like. A compression/tension rod 16 couples the monument 14 to the inner joint connection head 4 of the rotary joint 1. A further compression/tension rod 16 in turn couples the outer joint connection head 8 to a further frame of the aircraft. The compression/tension rods 16 can be plugged, for example, onto the joint connection heads 4, 8 and/or be connected or fastened thereto in some other way.

By virtue of the double-spherical design of the rotary joint 1, it is ensured at any time in this application that the load paths of the two compression/tension rods 16 meet precisely in the centre point of the rotary joint 1, completely independently of whether tolerances or deflections of the components are present. Should, for example, the monument 14, and hence also the compression/tension rod 16 coupled thereto, be displaced, the inner joint element 2 correspondingly moves as well because of the coupling of the inner joint connection head 4 by the inner joint element 2 rotating in the outer joint element 5. Here, the rotary joint 1 provides two independent degrees of rotational freedom, with the result that both coupled compression/tension rods 16 can be oriented independently of one another. Thus, the rotary joint 1 compensates for possibly present tolerances and prevents a situation in which unplanned loads are introduced into the frames, i.e. both unintended loads and loads which do not lie in the desired plane, i.e. flat.

In the preceding detailed description, various features for improving the stringency of the illustration have been combined in one or more examples. However, it should be clear that the above description is merely illustrative, and does not have a restrictive nature in any way. It serves to cover all the alternatives, modifications and equivalents of the various features and exemplary embodiments. Many other examples will be immediately and directly clear to a person skilled in the art on the basis of his/her technical knowledge in view of the above description.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rotary joint, having:
    an inner joint element which has a spherically shaped inner convex joint face and an inner joint connection head protruding from the inner convex joint face;
    an outer joint element which has a spherically shaped inner concave joint face, a spherically shaped outer convex joint face and an outer joint connection head protruding from the outer convex joint face, wherein the inner joint element is held within the outer joint element such that the two joint elements are rotatable with respect to one another along the inner joint faces; and
    a joint bearing which has a spherically shaped outer concave joint face, wherein the outer joint element is held within the joint bearing such that the outer joint element is rotatable in the joint bearing along the outer convex and concave joint faces, and wherein the joint bearing does not contact the inner convex joint face.

2. The rotary joint according to claim 1, wherein the inner joint element is in a form of a sphere.

3. The rotary joint according to claim 1, wherein the outer joint element is in a form of a hollow sphere with a clearance through which the inner joint connection head projects.

4. The rotary joint according to claim 1, wherein the joint bearing is annular and the outer concave joint face of the joint bearing is a symmetrical spherical zone.

5. The rotary joint according to claim 1, wherein a curvature of the inner convex joint face corresponds to a curvature of the inner concave joint face and a curvature of the outer convex joint face corresponds to a curvature of the outer concave joint face.

6. The rotary joint according to claim 1, wherein the inner joint element fits in the outer joint element and/or the outer joint element fits in the joint bearing.

7. The rotary joint according to claim 1, wherein the two joint connection heads are oriented in opposite hemispheres.

8. The rotary joint according to claim 1, wherein the two joint connection heads protrude from their respective convex joint faces in a radial direction.

9. The rotary joint according to claim 1, wherein the inner joint element, the outer joint element and the joint bearing are each formed integrally, in particular in an additive process.

10. The rotary joint according to claim 1, further comprising a baseplate which bears the joint bearing.

11. A fastening arrangement for positionally fixing a monument on a structure of a vehicle, in particular an aircraft or spacecraft, comprising:
    a rotary joint with an inner joint element which has a spherically shaped inner convex joint face and an inner joint connection head protruding from the inner convex joint face;
    an outer joint element which has a spherically shaped inner concave joint face, a spherically shaped outer convex joint face and an outer joint connection head protruding from the outer convex joint face, wherein the inner joint element is held within the outer joint element such that the two joint elements are rotatable with respect to one another along the inner joint faces; and
    a joint bearing which has a spherically shaped outer concave joint face, wherein the outer joint element is held within the joint bearing such that the outer joint element is rotatable in the joint bearing along the outer convex and concave joint faces;
    a compression/tension rod which couples the monument to one of the joint connection heads of the rotary joint; and
    a further compression/tension rod which couples the correspondingly other joint connection head to the structure of the vehicle.

12. The fastening arrangement according to claim 11, wherein the structure is a frame and the rotary joint is fastened to an adjacent frame.

13. An aircraft or spacecraft having a fastening arrangement for positionally fixing a monument on the aircraft or spacecraft, the fastening arrangement comprising:
    a rotary joint with an inner joint element which has a spherically shaped inner convex joint face and an inner joint connection head protruding from the inner convex joint face;
    an outer joint element which has a spherically shaped inner concave joint face, a spherically shaped outer convex joint face and an outer joint connection head protruding from the outer convex joint face, wherein the inner joint element is held within the outer joint element such that the two joint elements are rotatable with respect to one another along the inner joint faces; and
    a joint bearing which has a spherically shaped outer concave joint face, wherein the outer joint element is held within the joint bearing such that the outer joint element is rotatable in the joint bearing along the outer convex and concave joint faces;
    a compression/tension rod which couples the monument to one of the joint connection heads of the rotary joint; and
    a further compression/tension rod which couples the correspondingly other joint connection head to the structure of the vehicle.

* * * * *